United States Patent [19]

Farias et al.

[11] Patent Number: 5,019,631
[45] Date of Patent: May 28, 1991

[54] ALKYLENE OXIDE MODIFIED POLY(2,6-DIMETHYL-P-OXYPHENYLENE)

[75] Inventors: Otello Farias, Rome; Alberto Gandini; Raffaella Monga, both of Milan; Arnaldo Roggero, San Donato Milanese; Raffaello Sisto; Claudio Valentini, both of Rome, all of Italy

[73] Assignee: Eniricerche S.p.A., Milan, Italy

[21] Appl. No.: 396,944

[22] Filed: Aug. 21, 1989

[30] Foreign Application Priority Data

Sep. 9, 1988 [IT] Italy ................................ 21875 A/88

[51] Int. Cl.$^5$ .............................................. C08G 65/48
[52] U.S. Cl. ...................................... 525/396; 264/41; 521/180; 521/189; 525/390
[58] Field of Search ................................ 525/396, 390

[56] References Cited

U.S. PATENT DOCUMENTS

| | | | |
|---|---|---|---|
| 3,402,144 | 9/1968 | Hay | 260/47 |
| 3,442,858 | 5/1969 | Hay | 260/47 |
| 3,522,326 | 7/1970 | Bostick et al. | 260/823 |
| 4,647,297 | 3/1987 | Zampini | 55/158 |

FOREIGN PATENT DOCUMENTS 0256530 2/1988 European Pat. Off. .

OTHER PUBLICATIONS

Chemical Abstracts, vol. 89, No. 2, Jul. 10, 1978, pp. 31, 33, 148r.
Chemical Abstracts, vol. 67, No. 8, Aug. 21, 1967, p. 3158, 89:7022e.

*Primary Examiner*—Harold D. Anderson
*Attorney, Agent, or Firm*—Hedman, Gibson, Costigan & Hoare

[57] ABSTRACT

A modified poly(2,6-dimethyl-p-oxyphenylene) with a glass transition temperature in the range of 180°–220° C. is described in which on the average between 10 and 60% of the macromolecules carry:

a) an

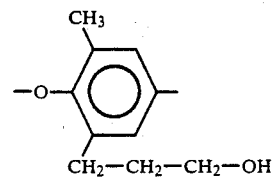

unit; or b) an

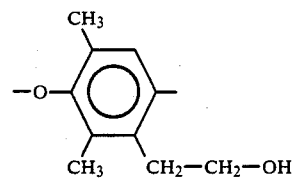

unit.

Said modified poly(2,6-dimethyl-p-oxyphenylene) is useful as a material in the preparation of flat membranes, in particular asymmetric membrane, for gas separation.

7 Claims, No Drawings

ALKYLENE OXIDE MODIFIED POLY(2,6-DIMETHYL-P-OXYPHENYLENE)

This invention relates to a modified poly(2,6-dimethyl-p-oxyphenylene), a process for its preparation and its use in gas-permeable membranes. In the ensuing description poly(2,6-dimethyl-p-oxyphenylene) is known as polyphenyleneoxide or PPO for short.

Gas-permeable polymer membranes are known in the art for use in separation processes for gas mixtures. The polymers used for this purpose can be chosen from a wide range such as silicone rubbers, natural rubber, butyl rubber, low-density polyethylene, polycarbonate, polyphenyleneoxide, polystyrene and cellulose acetate, as described for example by S. A. Stern, ACHEMA 1985, Plenary Lecture, and by H. B. Hopfenberg and V. T. Stannett in "Material Science of Synthetic Membranes", ACS Symposium, Series No. 269, Chapter 2.

Of these polymers, polyphenyleneoxide possesses interesting permeability and selectivity characteristics which are intrinsic to the material itself. However the use of this polymer in gas separation membranes is hindered by its poor solubility in water-miscible aprotic polar solvents, which is an essential condition for producing asymmetric membranes by phase inversion using water as coagulant. Precipitation by phase inversion is a method for producing membranes in which the active layer for the gas separation can be easily reduced to values of the order of one micron or less, and in which the larger porosity section, which is not active in the separation, acts as the support. A known method for preparing flat polyphenyleneoxide by phase inversion is to coagulate, in methanol, solutions of polymer in trichloroethylene containing n-octanol as described by Wijmans et al. in J. Pol. Phys. Eds., 23, 1941 (1985). This is however a method difficult to implement on an industrial scale for cost, safety and environmental reasons.

According to the present invention, a modified polyphenyleneoxide has now been found which can be used as material for gas-separation membranes. In particular, said modified polyphenyleneoxide is soluble in the normal water-miscible aprotic solvents thus making it possible to use water as the non-solvent in the preparation of asymmetric membranes by the phase inversion method. It has also been found that the asymmetric membranes obtained in this manner, having an active layer thickness of 10 μm or less, give high permeability in gas-separation processes while maintaining the inherent selectivity of polyphenyleneoxide.

In accordance therewith, a first object of the present invention is to provide an amorphous modified poly(2,6-dimethyl-p-oxyphenylene) with a glass transition temperature in the range of 180°–220° C. in which on the average between 10 and 60% of the macromolecules carry:

(a) an

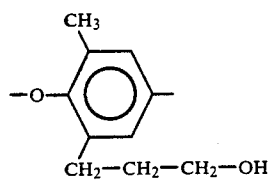

unit; or (b) an

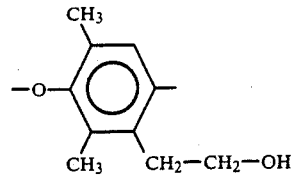

unit.

A second object of the present invention is to provide a process for preparing modified polyphenyleneoxide having the aforesaid characteristic, comprising reacting polyphenyleneoxide with a metalating agent to produce metalated polyphenyleneoxide, and then reacting this latter with ethylene oxide.

A further object of the present invention is to provide a flat membrane, in particular a flat asymmetric membrane, obtained from said modified polyphenyleneoxide.

The polyphenyleneoxide subjected to the process of the present invention is the known polymer having a numerical molecular weight of between 15,000 and 25,000 and with polydispersion of between 1.4 and 2.5, and prepared in the art by oxidative polymerization of 2,6-xylenol in the presence of a catalyst preferably chosen from copper complex catalysts.

The polyphenyleneoxide metalation is effected with the polymer dissolved in an inert organic solvent generally chosen from liquid aliphatic, cycloaliphatic and aromatic (e.g. benzene, toluene) hydrocarbons, and ethers (e.g. tetrahydrofuran). The metalating agent useful for this purpose can be an alkaline metal alkyl (C1–C12), or an alkaline metal hydride or amide and preferably a lithium-alkyl (C1–C12). The polyphenyleneoxide metalation is normally carried out at a temperature of between −30° and 80° C. for a time of between 1 minute and about 4 hours, using a ratio of moles of metalating agent to polyphenyleneoxide macromolecules of between 0.1:1 and 1:1. The metalation can be conducted in the presence of an activator normally chosen from tetramethylethylenediamine, potassium t-butylate and diazabicyclo-octane, with a molar ratio of metalating agent to activator of between 1:0.1 and 1:10 and preferably of the order of 1:0.5–1:1. The metalated polyphenyleneoxide obtained in this manner is interacted with ethylene oxide to obtain the modified polyphenyleneoxide according to the present invention.

Conveniently, the ethylene oxide is added to the reaction mixture from the metalation stage in a quantity at least equivalent to the alkaline metal of the metalated polyphenyleneoxide, operating at a temperature of between −30° and 80° C. and preferably 20° to 40° C. for a time of between 5 minutes and about 2 hours and generally of the order of 30–60 minutes.

In this manner the modified polyphenyleneoxide of the present invention is obtained, and is separated from the reaction mixture by the normal methods and possibly subjected to purification. This modified polyphenyleneoxide is an amorphous solid with a glass transition temperature of between 180° and 220° C. (DSC determination), containing unaltered monomer units and monomer units hydroxyalkylated at the methyl and at the aromatic nucleus as verified by nuclear magnetic resonance analysis (NMR). The methyl substitutions generally prevail, especially when the polyphenyleneoxide metalation is effected in non-polar solvents. The modified polyphenyleneoxide of the present invention can be converted into homogeneous flat membranes by the usual methods of dissolving the polymer in a suitable solvent (such as chloroform) and depositing the solution in the form of a thin layer on a suitable support. After controlled evaporation of the solvent, homogeneous flat membranes of modified polyphenyleneoxide are obtained with a thickness generally varying from 1 to 120 $\mu$m and preferably of the order of 10–50 $\mu$m, which are permeable and selective in the separation of gaseous mixtures.

In the preferred embodiment the modified polyphenyleneoxide of the present invention is converted into the flat asymmetric membrane by the phase inversion method using water as non-solvent. This is made possible by the fact that such a polyphenyleneoxide is soluble in water-miscible aprotic polar solvents. Specifically, according to this method the modified polyphenyleneoxide is dissolved in a solvent such as dimethylacetamide, dioxane, methyl-pyrrolidone, tetramethylurea, formyl-morpholine or formyl-piperidine so as to form a solution containing from 5 to 30% of polymer by weight. The solution obtained is spread as a film over a support, such as a glass sheet, and the coated support is placed in contact with a water coagulation bath to cause phase inversion and formation of the flat asymmetric membrane.

Such a membrane consists of a dense active skin with a thickness of the order of 0.1–10 $\mu$m and a macroporous support layer the thickness of which can vary from 50 to 120 $\mu$m. It can sometimes be useful to coat the active layer with a thin elastomer film in case imperfections are present in the dense layer.

The flat asymmetric membranes according to the present invention are highly permeable and selective in separation processes for gaseous mixtures containing for example methane, carbon dioxide, nitrogen, oxygen, hydrogen and hydrogen sulphide.

The experimental examples given hereinafter better illustrate the invention.

EXAMPLES 1–9

Preparation of modified polyphenyleneoxide

The apparatus used was a glass reactor of 500 ml capacity fitted with a mechanical stirrer, filling funnel, thermometer and dip tube, and kept under a nitrogen flow. The solvent, namely toluene (Examples 3, 4 and 5), benzene (Examples 2 and 6) or tetrahydrofuran (Examples 1, 7, 8 and 9), and a polyphenyleneoxide [poly(2,6-dimethyl-p-oxyphenylene)] are fed into the reactor, the polyphenyleneoxide having the following characteristics:

| | |
|---|---|
| average ponderal molecular weight | M.W = 22,600 |
| ration of average ponderal to numerical molecular weight | M.W/M.N = 1.47 |
| intrinsic viscosity (25° C.; chloroform) | [n] = 0.33 dl/g |
| glass transition temperature | Tg = 214° C. |

In each case, solutions were prepared containing 4% of polyphenyleneoxide by weight. The mixture was heated to about 50° C. to facilitate dissolution and then to the temperature chosen for the metalation. The metalated polyphenyleneoxide is obtained by bringing n-butyllithium into contact with the polyphenyleneoxide solution. If the solvent is benzene or toluene, tetramethylethylenediamine is also introduced as activator in a molar ratio of 1:1 to the n-butyllithium. The metalated polyphenyleneoxide obtained is functionalized with the —$CH_2$—$CH_2$—OH group by reaction with ethylene oxide. Specifically, the ethylene oxide is made to flow for a time of 10 minutes (Examples 1, 2 and 3) or the reactor is pressurized with a quantity of ethylene oxide which is slightly greater (in moles) than the moles of n-butyllithium previously added (remaining examples). After functionalization, the functionalized polyphenyleneoxide suspension is treated with methanol and water. The functionalized polymer is then separated from the suspension, dissolved in chloroform, precipitated with n-hexane and dried at 70° C. in an oven under vacuum.

Table 1 shows the reaction conditions, in which:
LiR (mmoles) = quantity of n-butyllithium fed, in moles;
LiR/PPO = ratio of moles of n-butyllithium to polyphenyleneoxide monomer units;
Tm (°C.) = metalation temperature in °C.;
tm (min) = metalation time in minutes;
Tf (°C.) = functionalization temperature in °C.;
tf (min) = functionalization time in minutes.

Table 2 shows the characteristics of the functionalized polyphenyleneoxide, in which:
T (mol %) = total percentage of functionalized polyphenylene oxide monomer units;
M (MOL %) = percentage of polyphenyleneoxide monomer units functionalized at the methyl;
A (mol %) = percentage of polyphenyleneoxide monomer units functionalized at the benzene ring;
Tg (°C.) = glass transition temperature (°C.) of the functionalized polyphenyleneoxide (DSC determination).

The extent of the functionalization and the distribution of the —$CH_2$—$CH_2$—OH functions were determined by $^1$H—NMR spectrum on the basis of the signals attributable to the protons of the two functionalized structures.

TABLE 1

| Ex. No. | LiR (mmoles) | LiR/PPO | Tm (°C.) | tm (min) | Tf (°C.) | tf (min) |
|---|---|---|---|---|---|---|
| 1 | 20.0 | 0.4 | 25 | 30 | 25 | 30 |
| 2 | 39.5 | 0.5 | 25 | 960 | 25 | 30 |
| 3 | 125.0 | 0.5 | 70 | 180 | 40 | 120 |
| 4 | 49.0 | 0.5 | 70 | 180 | 40 | 60 |
| 5 | 25.0 | 0.3 | 70 | 180 | 40 | 60 |
| 6 | 68.0 | 0.7 | 70 | 180 | 40 | 60 |
| 7 | 39.8 | 0.5 | 25 | 15 | 25 | 60 |
| 8 | 64.0 | 0.7 | 25 | 30 | 25 | 60 |
| 9 | 71.6 | 1.0 | 25 | 3 | 25 | 60 |

TABLE 2

| Ex. No. | M (mol %) | A (mol %) | T (mol %) | Tg (°C.) |
|---|---|---|---|---|
| 1 | 16.9 | 7.8 | 24.7 | 195 |
| 2 | 14.8 | 6.4 | 21.2 | 199 |
| 3 | 55.5 | 1.0 | 56.5 | 180 |
| 4 | 40.0 | 3.0 | 43.0 | 184 |
| 5 | 21.6 | 1.0 | 22.6 | 198 |
| 6 | 35.0 | 3.8 | 38.8 | 188 |
| 7 | 16.9 | 8.5 | 25.4 | 209 |
| 8 | 22.7 | 12.3 | 35.0 | 206 |
| 9 | 25.8 | 19.4 | 45.2 | 209 |

EXAMPLE 10

1 g samples of each modified polyphenyleneoxide obtained in Examples 1 to 9 are dissolved in 5 ml of chloroform operating at ambient temperature. After leaving to stand for about 15 minutes, each solution is spread over a glass sheet by the Gardner knife device (Pacific Scientific Gardner/Neotec Instrument Division) with a 15 mil gap, operating by the ASTM D-823-53 (1970) method, the D-823 procedure then being used to separate the membrane for testing. Most of the solvent is allowed to evaporate slowly at ambient temperature, the sheet then being placed firstly for 15 minutes under a bell jar saturated with chloroform vapour and then for a further 15 minutes under an air flow in an aspiration hood. The final solvent traces are removed by treatment at high temperature (110° C.) under vacuum (16 mmHg) for about 2 hours. The polymer film is separated by immersing the glass sheet in water. The membrane obtained is dried in an oven under vacuum. A circular portion of 11 cm diameter is cut from the membrane for the permeability test. Table 3 shows the values obtained by testing the membranes for permeability to the various indicated gases using the Lyssy apparatus (Lyssy permeameter GMP-200, Analytical Gas Permeability). The permeability values given in the table are measured at 35° C. with a difference in partial pressure of the permeating gas of 76 cmHg ($10^{10}.cm^3STP.cm/cm^2.sec.cmHg$) and represent the average of five measurements. The table gives the value of the membrane thicknesses in $\mu m$. This thickness is obtained by measuring the film with a comparator at 20 equidistant points and taking the mathematical mean. The table also gives the selectivity values $\alpha 1 = P(CO_2)/P(CH_4)$ and $\alpha 2 = P(O_2)/P(N_2)$.

TABLE 3

| Ex. No. | Membrane thickness ($\mu m$) | $P(CO_2)$ | $P(CH_4)$ | $P(O_2)$ | $P(N_2)$ | $\alpha 1$ | $\alpha 2$ |
|---|---|---|---|---|---|---|---|
| 1 | 38 ± 4 | 34.4 | 2.0 | 20.1 | 12.4 | 17.2 | 1.6 |
| 2 | 55 ± 5 | 31.5 | 2.0 | 6.1 | 1.5 | 15.8 | 4.1 |
| 3 | 45 ± 4 | 12.3 | 0.6 | 2.6 | 0.7 | 20.5 | 3.7 |
| 4 | 41 ± 3 | 12.4 | 0.8 | 2.7 | 0.7 | 15.5 | 3.6 |
| 5 | 24 ± 5 | 36.3 | 5.1 | 11.3 | 5.5 | 7.1 | 2.1 |
| 6 | 50 ± 6 | 13.0 | 1.7 | 3.1 | 1.5 | 7.6 | 2.1 |
| 7 | 44 ± 6 | 29.7 | 2.3 | 6.4 | 2.0 | 13.0 | 3.2 |
| 8 | 45 ± 4 | 26.7 | 1.5 | 5.1 | 1.1 | 17.8 | 4.6 |
| 9 | 53 ± 4 | 28.4 | 1.4 | 5.6 | 1.3 | 20.3 | 4.3 |

EXAMPLE 11

The modified polyphenyleneoxide obtained in Example 4 is converted into an asymmetric membrane by the phase inversion method. Specifically, modified polyphenyleneoxide solutions are prepared with a concentration of between 25 and 30 weight % in tetramethylurea. For this purpose the polymer is added to the solvent in small successive portions. When dissolving is complete, an aliquot of the solution is withdrawn and placed in the appropriate dish of the stratifier. A knife of 300 $\mu m$ fixed thickness is placed at the end of the dish. The glass sheet is positioned between the surface of the stratifier and the aforesaid apparatus. The asymmetric membrane is prepared in the following manner. The glass sheet is sprinkled slowly but continuously until the solvent is completely distributed. The sheet is then placed in the coagulant bath consisting of double distilled water, in which phase inversion takes place to form the asymmetric membrane. This when formed is left for about 3 hours in the bath and is then washed with double distilled water and finally dried.

A 3×3 cm sample of the membrane is glued between two 11×11 cm aluminium sheets at the centre of which a 1.6 cm diameter hole is provided. The test piece obtained in this manner is mounted between two half cells of a Lyssy GMP 200 permeameter. The permeability is measured at 35° C. at a permeating gas pressure on the upstream side of 76 cmHg. The asymmetric membrane is characterised according to its permeance (gas flow divided by unit of pressure) expressed in $10^6$ $cm^3.STP/cm^2sec.cmHg$. The equivalent thickness of the active layer (skin) in the gas separation is calculated as the ratio of polymer permeability coefficient, measured on a homogeneous flat membrane, to the permeance of the asymmetric membrane.

Three tests are conducted. In the first test a 25 weight % solution of the modified polyphenyleneoxide of Example 4 in tetramethylurea is used and an asymmetric membrane is obtained having the following permeance and selectivity characteristics: $P(CO_2) = 84.5$; $P(CH_4) = 90.3$; $P(O_2) = 58.9$; $P(N_2) = 53.7$; $\alpha 1 = 0.9$; $\alpha 2 = 1.1$. In the second test a 27.5 weight % solution is used, the asymmetric membrane having the following characteristics: $P(CO_2) = 18.8$; $P(CH_4) = 3.0$; $P(O_2) = 5.6$; $P(N_2) = 2.2$; $\alpha 1 = 6.3$; $\alpha 2 = 2.6$. In the third test a 30 weight % solution is used, the asymmetric membrane having the following characteristics: $P(CO_2) = 1.2$; $P(CH_4) = 0.1$; $P(O_2) = 0.3$; $P(N_2) = 0.1$; $\alpha 1 = 12.6$; $\alpha 2 = 3.4$; skin = 9.1 $\mu m$.

EXAMPLE 12

The procedure is similar to Example 11 but the modified polyphenyleneoxide of Example 9 is used. In a first test a 20 weight % solution of the polymer in dimethylacetamide is used and in a second test a 25 weight % solution is used. The following permeance and selectivity values are obtained. First test: $P(CO_2) = 67.5$; $P(CH_4) = 43.7$; $P(O_2) = 41.8$; $P(N_2) = 34.2$; $\alpha 1 = 1.4$; $\alpha 2 = 1.2$. Second test: $P(CO_2) = 2.8$; $P(CH_4) = 0.15$; $P(O_2) = 0.5$; $P(N_2) = 0.11$; $\alpha 1 = 18.6$; $\alpha 2 = 4.6$.

We claim:

1. An amorphous modified poly (2,6-dimethyl-p-oxyphenylene) with a glass transition temperature of from 180° to 220° C. wherein on the average from 10 to 60% of said amorphous modified poly (2,6-dimethyl-p-oxyphenylene) comprise:

(a)

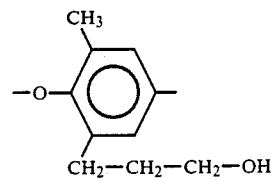

or (b)

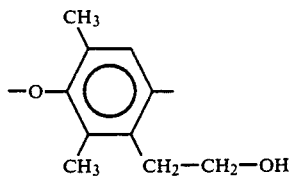

2. A process for preparing the amorphous modified poly (2,6-dimethyl-p-oxyphenylene) of claim 1, comprising:
   (a) metalating poly(2,6-dimethyl-p-oxyphenylene) with an alkaline metal selected from the group consisting of an alkaline metal alkyl ($C_1$–$C_{12}$), an alkaline metal hydride and an alkaline metal amide; having a molar ratio of said metalating agent to said poly(2,6-dimethyl-p-oxyphenylene) of from 0.1:1 to 1:1, in an inert solvent at a temperature from −30° to 80° C., for from 1 minute to 4 hours;
   (b) reacting said metalated poly(2,6-dimethyl-p-oxyphenylene) with ethylene oxide in an amount at least equal to the amount of alkaline metal of step (a) in an inert organic solvent at a temperature of from −30° to 80° C., for from 5 minutes to 2 hours to form modified poly(2,6-dimethyl-p-oxyphenylene);
   (c) recovering from step (b) modified poly(2,6-dimethyl-p-oxyphenylene).

3. The process for preparing the amorphous modified poly(2,6-dimethyl-p-oxyphenylene) of claim 2, wherein the metalating is in the presence of an activator selected from the group consisting of tetramethylethylenediamine, potassium t-butylate and diazabicyclo-octane; wherein the molar ratio of said metalating agent to said activator is from 1:0.1 to 1:10.

4. The process for preparing the amorphous modified poly(2,6-dimethyl-p-oxyphenylene) of claim 3, wherein said molar ratio of said metalating agent to said activator is from 1:0.5 to 1:1.

5. The process for preparing the amorphous modified poly(2,6-dimethyl-p-oxyphenylene) of claim 2, wherein said metalating agent is lithium alkyl ($C_1$–$C_{12}$).

6. The process for preparing the amorphous modified poly(2,6-dimethyl-p-oxyphenylene) of claim 2, wherein said reacting is in an inert organic solvent at a temperature of from 20° to 40° C. for from 5 minutes to 2 hours.

7. The process for preparing the amorphous modified poly(2,6-dimethyl-p-oxyphenylene) of claim 6, wherein said reacting is for 30 to 60 minutes.

* * * * *